United States Patent
Chin et al.

(10) Patent No.: US 8,165,096 B2
(45) Date of Patent: Apr. 24, 2012

(54) METHODS AND SYSTEMS OF IMPROVED SUCCESS RATE FOR DECODING DOWNLINK MAP AND UPLINK MAP IES IN MOBILE WIMAX MOBILE

(75) Inventors: Tom Chin, San Diego, CA (US); Kuo-chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 993 days.

(21) Appl. No.: 12/123,395

(22) Filed: May 19, 2008

(65) Prior Publication Data
US 2009/0285164 A1   Nov. 19, 2009

(51) Int. Cl.
*H04W 4/00* (2009.01)
(52) U.S. Cl. ........................ 370/332; 725/111
(58) Field of Classification Search .................. 370/332; 725/111
See application file for complete search history.

(56) References Cited

U.S. PATENT DOCUMENTS

| | | | |
|---|---|---|---|
| 7,587,529 B2 * | 9/2009 | Lee et al. | 710/35 |
| 7,852,826 B2 * | 12/2010 | Kitchin | 370/349 |
| 2007/0206561 A1 | 9/2007 | Son et al. | |
| 2007/0261087 A1 * | 11/2007 | Denney et al. | 725/95 |
| 2008/0095037 A1 * | 4/2008 | Chang et al. | 370/204 |
| 2008/0267104 A1 * | 10/2008 | Zhang | 370/311 |
| 2009/0219853 A1 * | 9/2009 | Hart et al. | 370/315 |
| 2010/0284321 A1 * | 11/2010 | Zhang | 370/312 |

FOREIGN PATENT DOCUMENTS

EP   1903710   3/2008

OTHER PUBLICATIONS

International Search Report and the Written Opinion—PCT/US2009/043489, International Search Authority—European Patent Office—Jan. 20, 2010.

* cited by examiner

*Primary Examiner* — Phuc Tran
(74) *Attorney, Agent, or Firm* — Charles Chesney

(57) ABSTRACT

Methods and apparatus for decoding MAP information elements (MAP IEs) in an orthogonal frequency-division multiplexing (OFDM) or orthogonal frequency division multiple access (OFDMA) frame, even when the received downlink (DL) or uplink (UL) MAP message cyclic redundancy check (CRC) fails, may be provided. By continuing to parse the MAP IEs in the MAP message despite a CRC failure in the MAP message or a data burst, the packet error rate may be reduced, and the wireless system throughput may be increased.

29 Claims, 19 Drawing Sheets

| FCH(DLFP)_Message_Format | |
|---|---|
| Used SCH bitmap: A bitmap indicating which groups of SCH are used on the 1st PUSC zone and on PUSC zones in which 'use all SC' indicator is set to '0' in STC_DL_Zone_IE0. Value 1 means used by this segment and 0 means not used.<br>                          2048      1024      512      128<br>   bit 0: SCH Group 0   0~11(12)  0~ 5(6)  0~4(5)    0(1)<br>   bit 1: SCH Group 1  12~19( 8)  6~ 9(4)  NA       NA<br>   bit 2: SCH Group 2  20~31(12)  10~15(6)  5~9(5)  1(1)<br>   bit 3: SCH Group 3  32~39( 8)  16~19(4)  NA       NA<br>   bit 4: SCH Group 4  40~51(12)  20~25(6)  10~14(5)  2(1)<br>   bit 5: SCH Group 5  52~59( 8)  26~29(4)  NA       NA | 6 bits |
| Reserved: set to 0 | 1 bit |
| Repetition Coding Indication: on DL Map<br>No additional Rep=total1(0), 1 additional Rep=total2(1),<br>3 additional Rep=total4(2), 5 additional Rep=total6(3) | 2 bits |
| Coding Indication: on DL Map<br>DL Map shall be transmitted with QPSK at FEC rate 1/2<br>The BS ensures that DL Map (and other MAC msg required for SS operation) are sent with the mandatory coding scheme often enough to ensure uninterrupted operation of SS supporting only the mandatory coding scheme.<br><br>CC(0), BTC(1), CTC(2), ZTCC(3), CC w oINT(4), LDPC(5) | 3 bits |
| DL Map Length:<br>Defines the length in slots of the DL Map msg that follows immediately the DLFP, after repetition code is applied. | 8 bits |
| Reserved: set to 0 | 4 bits |

FIG. 4B

| Information Element | Size |
|---|---|
| Management Message Type = 2 | 8 bits |
| Frame Duration Code | 8 bits |
| Frame Number | 24 bits |
| DCD Count | 8 bits |
| Base Station ID | 48 bits |
| No. OFDMA Symbols in DL Subframe | 8 bits |
| DL-MAP_IE 1 | Variable |
| DL-MAP_IE 2 | Variable |
| ⋮ | |
| DL-MAP_IE n | Variable |
| Padding | 0 or 4 bits |

FIG. 5B

MAP IEs with DIUC 0-12 and 13

| SYNTAX | SIZE |
|---|---|
| DIUC = 0 - 13 | 4 bits |
| If (INC_CID = 1) { | |
| N_CID = n | 8 bits |
| CID 1 | 16 bits |
| • • • | |
| CID n | 16 bits |
| } | |
| OFDMA Symbol Offset | 8 bits |
| If (Permutation is AMC 2x3 or 1x6) { | |
| Subchannel Offset | 8 bits |
| Boosting | 3 bits |
| No. OFDMA Triple Symbols | 5 bits |
| No. Subchannels | 6 bits |
| }else{ | |
| Subchannel Offset | 6 bits |
| Boosting | 3 bits |
| No. OFDMA Symbols | 7 bits |
| No. OFDMA Subchannels | 6 bits |
| } | |
| Repetition Coding Indication | 2 bits |

FIG. 7A

DL-MAP Extended IE

| SYNTAX | SIZE |
|---|---|
| DIUC = 15 | 4 bits |
| Extended DIUC | 4 bits |
| Length | 4 bits |
| ⋮ | |

FIG. 7B

DL-MAP Extended-2 IE

| SYNTAX | SIZE |
|---|---|
| DIUC = 14 | 4 bits |
| Extended-2 DIUC | 4 bits |
| Length | 8 bits |
| ⋮ | |

FIG. 7C

| Information Element | Size |
|---|---|
| Management Message Type = 3 | 8 bits |
| Reserved | 8 bits |
| UCD Count | 8 bits |
| Allocation Start Time | 32 bits |
| No. OFDMA Symbols in UL Subframe | 8 bits |
| UL-MAP_IE 1 | Variable |
| UL-MAP_IE 2 | Variable |
| ⋮ | |
| UL-MAP_IE N | Variable |
| Padding | 0 or 4 bits |

| SYNTAX | SIZE |
|---|---|
| CID | 16 bits |
| UIUC = 1-10 | 4 bits |
| Duration | 10 bits |
| Repetition Coding Indication | 2 bits |
| If (AAS or AMC UL zone){ | |
| Slot Offset | 12 bits |
| } | |

FIG. 11A

| SYNTAX | SIZE |
|---|---|
| CID | 16 bits |
| UIUC = 11 | 4 bits |
| Extended-2 UIUC | 4 bits |
| Length | 8 bits |
| ⋮ | |

FIG. 11B

| SYNTAX | SIZE |
|---|---|
| CID | 16 bits |
| UIUC = 15 | 4 bits |
| Extended UIUC | 4 bits |
| Length | 4 bits |
| ⋮ | |

FIG. 11C

| SYNTAX | SIZE |
|---|---|
| CID | 16 bits |
| UIUC = 0, 12, 13 | 4 bits |
| | 32 bits |

FIG. 11D

| SYNTAX | SIZE |
|---|---|
| CID | 16 bits |
| UIUC = 14 | 4 bits |
| | 40 bits |

FIG. 11E

METHODS AND SYSTEMS OF IMPROVED SUCCESS RATE FOR DECODING DOWNLINK MAP AND UPLINK MAP IES IN MOBILE WIMAX MOBILE

TECHNICAL FIELD

Certain embodiments of the present disclosure generally relate to wireless communication and, more particularly, to decoding MAP information elements (MAP IEs) in orthogonal frequency-division multiplexing (OFDM) or orthogonal frequency division multiple access (OFDMA) frames.

BACKGROUND

OFDM and OFDMA wireless communication systems under IEEE 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station emits and receives radio frequency (RF) signals that convey data to and from the mobile stations. Such an RF signal from a base station includes an overhead load, in addition to the data load (voice and other data), for various communication management functions. Each mobile station processes the information in the overhead load of each received signal prior to processing the data.

Under the current versions of the IEEE 802.16x standard for the OFDMA systems, every downlink subframe from a base station includes a preamble, a frame control header (FCH) following the preamble, and a downlink map (DL-MAP) following the FCH as part of the overhead load. The preamble includes information for searching a cell and a cell sector within a cell and for synchronizing a mobile station in both time and frequency with the received downlink signal. The FCH portion of the downlink subframe includes 24 bits with information on the downlink transmission format (e.g., the DL-MAP) and control information for the downlink data reception (e.g., allocation of the subcarriers in the current downlink frame). The DL-MAP specifies downlink data region allocation and burst profile information so that the DL data bursts in the OFDM/OFDMA frame may be correctly decoded. The first DL data burst is typically an uplink map (UL-MAP) containing similar allocation and burst profile information for uplink transmissions on a per-frame basis.

Therefore, a receiver, such as a mobile station, first decodes the FCH to determine the position of the DL-MAP, decodes the DL-MAP of the corresponding position, and then extracts the data including the UL-MAP as the first DL data burst. Due to the nature of the information in the DL-MAP (UL-MAP), if the reception of the DL-MAP (UL-MAP) fails or the DL-MAP (UL-MAP) is decoded incorrectly, the following downlink (uplink) operations on the receiver side cannot be properly executed. Accordingly, proper interpretation of the DL-MAP and the UL-MAP is important to OFDM and OFDMA system operation.

SUMMARY

Certain embodiments of the present disclosure generally relate to decoding MAP information elements (MAP IEs) in an orthogonal frequency-division multiplexing (OFDM) or orthogonal frequency division multiple access (OFDMA) frame despite a MAP message cyclic redundancy check (CRC) failure. By continuing to parse MAP IEs in the MAP message despite the CRC failure, the packet error rate may be reduced, and the system throughput may be increased.

Certain embodiments of the present disclosure provide a method. The method generally includes receiving a MAP message, performing an error check on the MAP message, and parsing the MAP message into a plurality of MAP IEs based on interval usage codes (IUCs) of the MAP IEs regardless of whether the error check failed.

Certain embodiments of the present disclosure provide a receiver for wireless communication. The receiver generally includes error checking logic configured to perform an error check on a MAP message of a signal received by the receiver and parsing logic configured to parse the MAP message into a plurality of MAP IEs based on IUCs of the MAP IEs regardless of whether the error check failed.

Certain embodiments of the present disclosure provide an apparatus for wireless communication. The apparatus generally includes means for receiving a MAP message; means for performing an error check on the MAP message; and means for parsing the MAP message into a plurality of MAP IEs based on IUCs of the MAP IEs regardless of whether the error check failed.

Certain embodiments of the present disclosure provide a mobile device. The mobile device generally includes a receiver front end for receiving a signal having a MAP message, error checking logic configured to perform an error check on the MAP message, and parsing logic configured to parse the MAP message into a plurality of MAP IEs based on IUCs of the MAP IEs regardless of whether the error check failed.

Certain embodiments of the present disclosure provide a computer-readable medium containing a program for interpreting a MAP message, which, when executed by a processor, performs certain operations. The operations generally include performing an error check on the MAP message and parsing the MAP message into a plurality of MAP IEs based on IUCs of the MAP IEs regardless of whether the error check failed.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIGS. 4A and 4B illustrate an example OFDM/OFDMA frame for Time Division Duplex (TDD) and the format of the Frame Control Header (FCH) contained therein, the FCH including downlink Frame Prefix (DLFP) information, in accordance with certain embodiments of the present disclosure.

FIGS. 5A and 5B illustrate the format of and the bit size of entries in a downlink map (DL-MAP) message with a generic DL-MAP information element (IE), in accordance with certain embodiments of the present disclosure.

FIGS. 7A-C illustrate bit sizes of elements for the different types of DL-MAP IEs in FIGS. 6A-C, in accordance with certain embodiments of the present disclosure.

FIGS. 11A-E illustrate bit sizes of elements for the different types of UL-MAP IEs in FIG. 10, in accordance with certain embodiments of the present disclosure.

DETAILED DESCRIPTION

Figure 1:
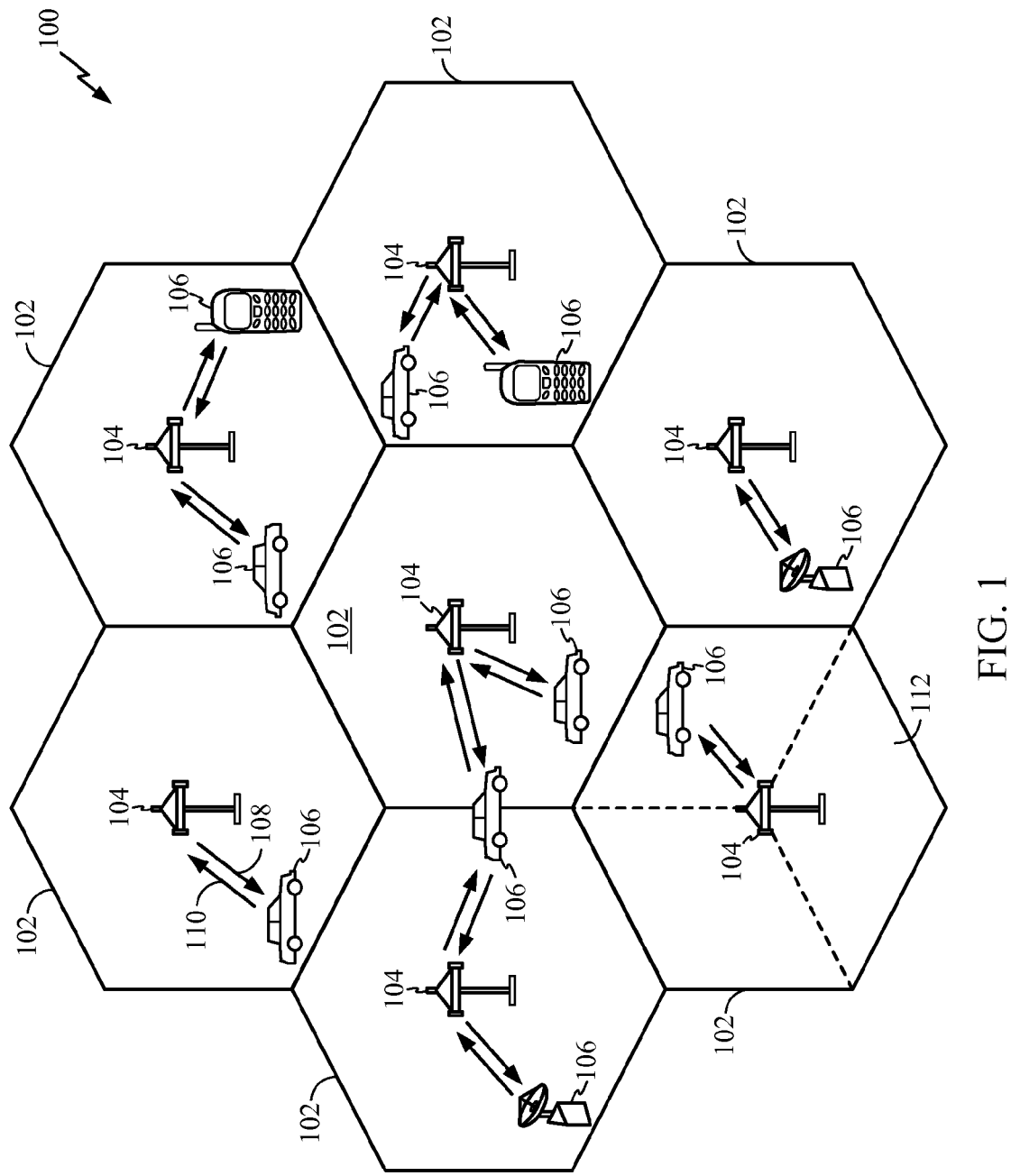
FIG. 1 illustrates an example wireless communication system, in accordance with certain embodiments of the present disclosure.

Certain embodiments of the present disclosure provide techniques and apparatus for decoding MAP information elements (MAP IEs) in an orthogonal frequency-division multiplexing (OFDM) or orthogonal frequency division multiple access (OFDMA) frame, even when the received downlink (DL) or uplink (UL) MAP message cyclic redundancy check (CRC) fails. By continuing to parse the MAP IEs in the MAP message despite a CRC failure in the MAP message or a data burst, the packet error rate may be reduced, and the wireless system throughput may be increased.

Exemplary Wireless Communication System

The methods and apparatus of the present disclosure may be utilized in a broadband wireless communication system. The term "broadband wireless" refers to technology that provides wireless, voice, Internet, and/or data network access over a given area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

Mobile WiMAX is based on OFDM (orthogonal frequency-division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates, and quality of service requirements.

The rapid growth in wireless internets and communications has led to an increasing demand for high data rate in the field of wireless communications services. OFDM/OFDMA systems are today regarded as one of the most promising research areas and as a key technology for the next generation of wireless communications. This is due to the fact that OFDM/OFDMA modulation schemes can provide many advantages such as modulation efficiency, spectrum efficiency, flexibility, and strong multipath immunity over conventional single carrier modulation schemes.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
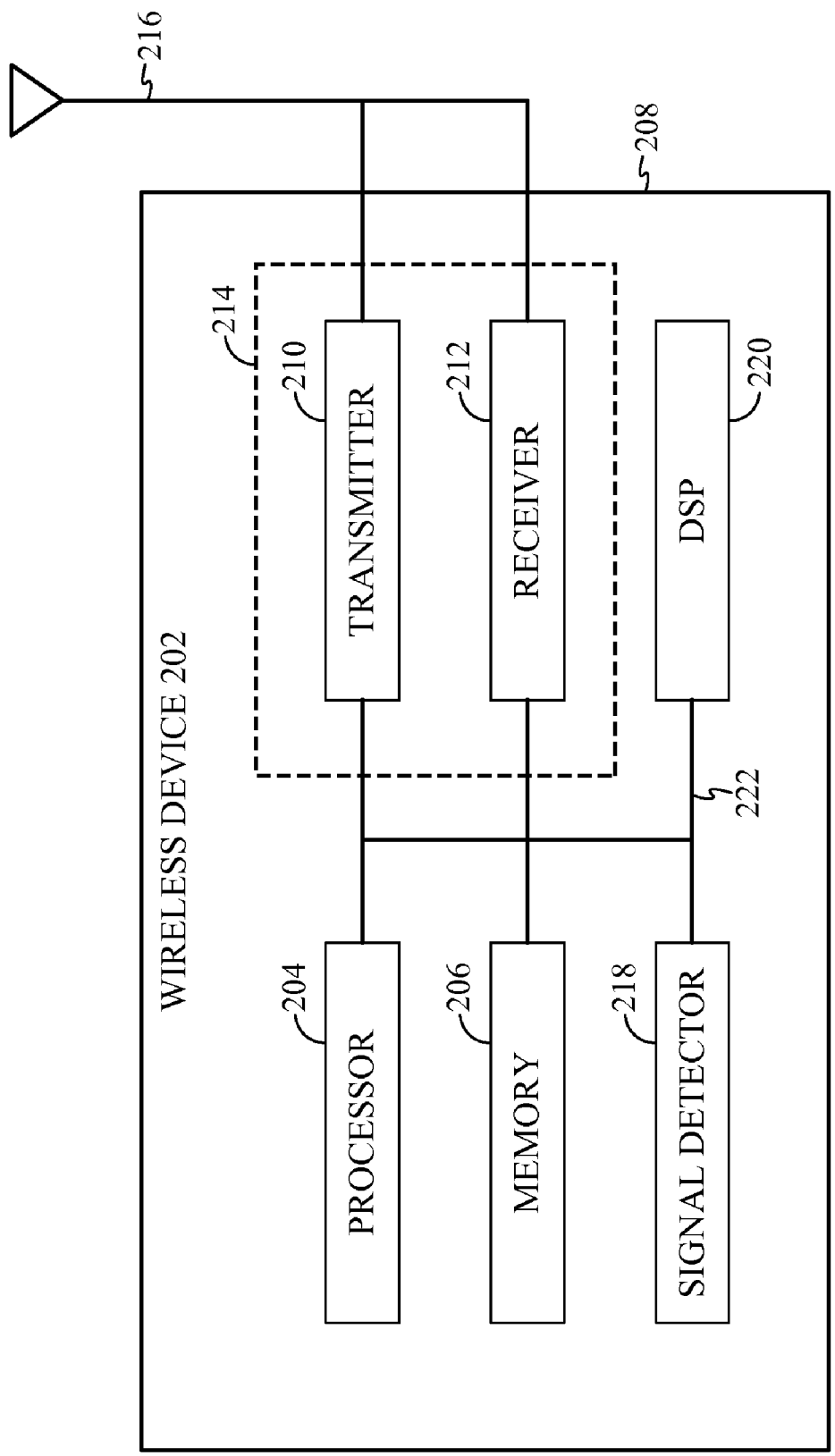
FIG. 2 illustrates various components that may be utilized in a wireless device in accordance with certain embodiments of the present disclosure.

FIG. 2 illustrates various components that may be utilized in a wireless device 202. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy from pilot subcarriers or signal energy from the preamble symbol, power spectral density, and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
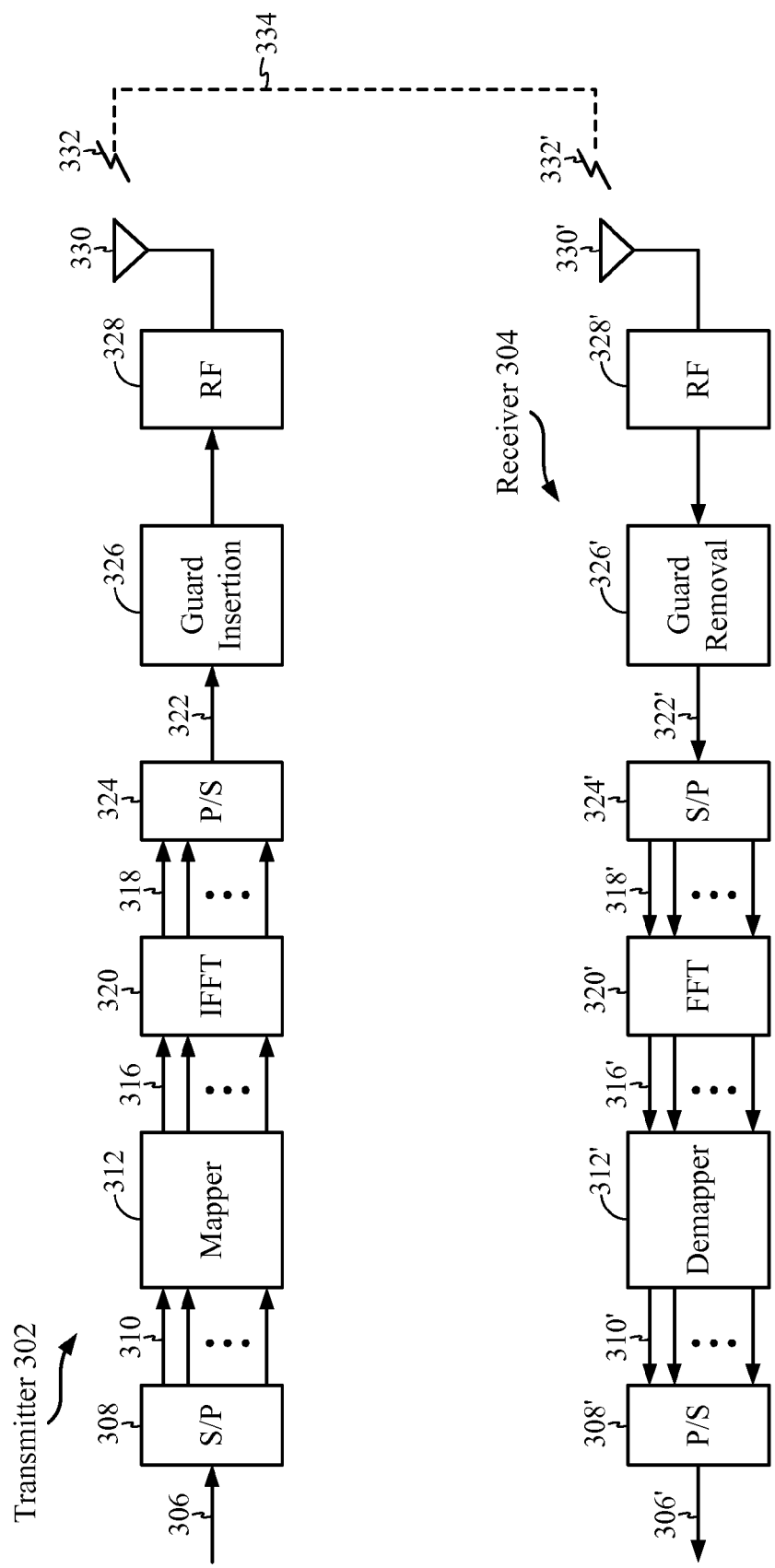
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless communication system 100 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312, thereby outputting N parallel data streams 310'. A P/S converter 308' may combine the N parallel data streams 310' into a single data stream 306'. Ideally, this data stream 306' corresponds to the data 306 that was provided as input to the transmitter 302.

Exemplary OFDM/OFDMA Frame

Figure 4A:
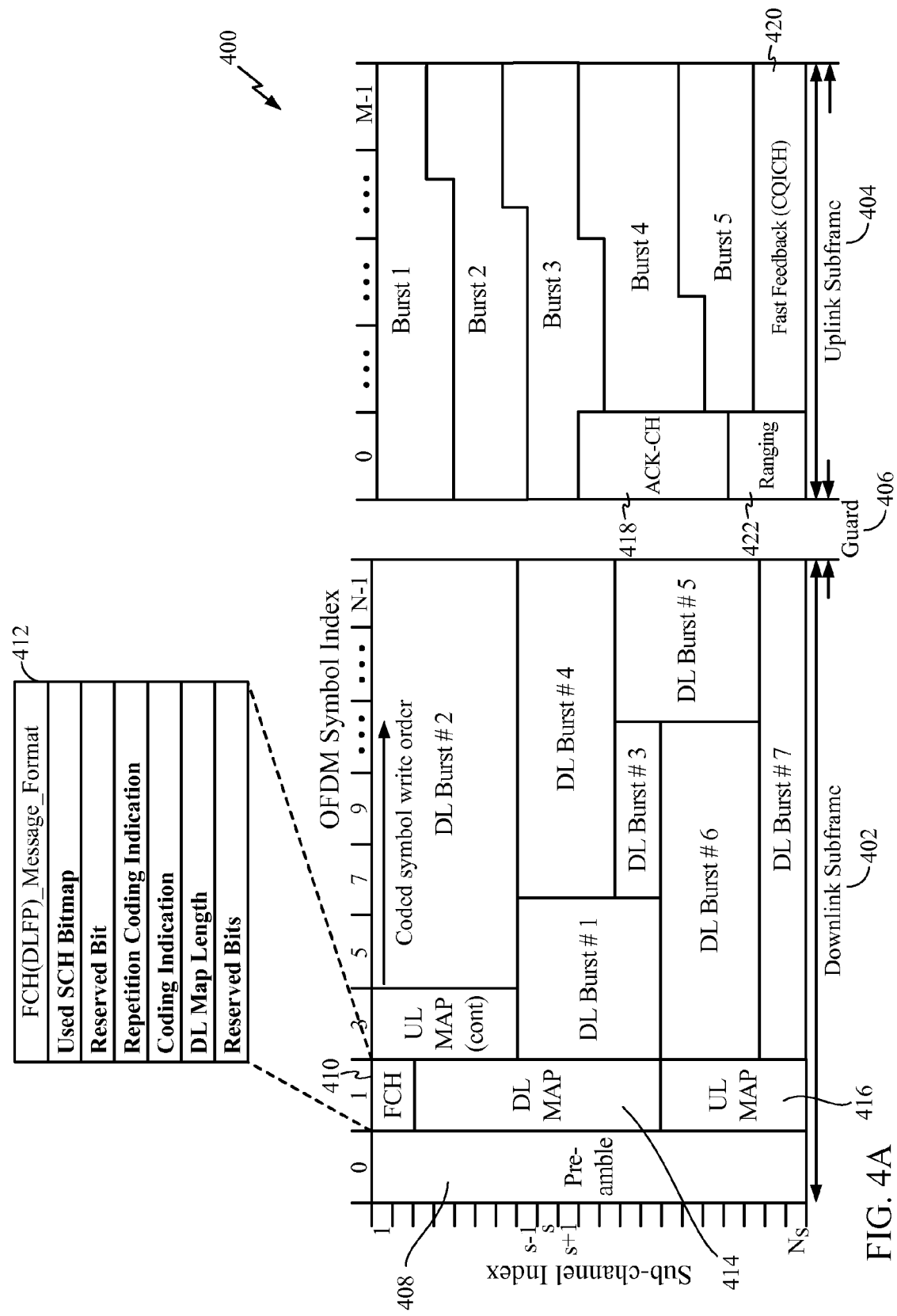

Referring now to FIG. 4A, an OFDM/OFDMA frame 400 for a Time Division Duplex (TDD) implementation is depicted as a typical, but not limiting, example. Other implementations of an OFDM/OFDMA frame, such as Full and Half-Duplex Frequency Division Duplex (FDD) may be used, in which case the frame is the same except that both downlink (DL) and uplink (UL) messages are transmitted simultaneously over different carriers. In the TDD implementation, each frame may be divided into a DL subframe 402 and a UL subframe 404, which may be separated by a small guard interval 406—or, more specifically, by Transmit/Receive and Receive/Transmit Transition Gaps (TTG and RTG, respectively)—in an effort to prevent DL and UL transmission collisions. The DL-to-UL-subframe ratio may be varied from 3:1 to 1:1 to support different traffic profiles.

Within the OFDM/OFDMA frame 400, various control information may be included. For example, the first OFDM/OFDMA symbol of the frame 400 may be a preamble 408, which may contain several pilot signals (pilots) used for synchronization. Fixed pilot sequences inside the preamble 408 may allow the receiver 304 to estimate frequency and phase errors and to synchronize to the transmitter 302. Moreover, fixed pilot sequences in the preamble 408 may be utilized to estimate and equalize wireless channels. The preamble 408 may contain BPSK-modulated carriers and is typically one OFDM symbol long. The carriers of the preamble 408 may be power boosted and are typically a few decibels (dB) (e.g., 9 dB) higher than the power level in the frequency domain of data portions in the WiMAX signal. The number of preamble carriers used may indicate which of the three segments of the zone are used. For example, carriers 0, 3, 6, . . . may indicate that segment 0 is to be used, carriers 1, 4, 7, . . . may indicate that segment 1 is to be used, and carriers 2, 5, 8, . . . may indicate that segment 2 is to be used.

A Frame Control Header (FCH) 410 may follow the preamble 408. The FCH 410 may provide frame configuration information, such as the usable subchannels, the modulation and coding scheme, and the MAP message length for the current OFDM/OFDMA frame. A data structure, such as the downlink Frame Prefix (DLFP) 412, outlining the frame configuration information may be mapped to the FCH 410.

As illustrated in FIG. 4B, the DLFP 412 for Mobile WiMAX may comprise six bits for the used subchannel (SCH) bitmap 412a, a reserved bit 412b set to 0, two bits for the repetition coding indication 412c, three bits for the coding indication 412d, eight bits for the MAP message length 412e, and four reserved bits 412f set to 0 for a total of 24 bits in the DLFP 412. Before being mapped to the FCH 410, the 24-bit DLFP may be duplicated to form a 48-bit block, which is the minimal forward error correction (FEC) block size.

Following the FCH 410, a DL-MAP 414 and a UL-MAP 416 may specify data burst allocation and other control information for the DL and UL subframes 402, 404. In the case of OFDMA, multiple users may be allocated data regions within the frame, and these allocations may be specified in the DL and UL-MAP messages 414, 416. The MAP messages may include the burst profile for each user, which defines the modulation and coding scheme used in a particular link. Since MAP messages contain critical information that needs to reach all users, the DL and UL-MAP messages 414, 416 may often be sent over a very reliable link, such as BPSK or QPSK with rate ½ coding and repetition coding. The DL subframe 402 of the OFDM/OFDMA frame may include DL bursts of various bit lengths containing the downlink data being communicated. Thus, the DL-MAP 414 may describe the location of the bursts contained in the downlink zones and the number of downlink bursts, as well as their offsets and lengths in both the time (i.e., symbol) and the frequency (i.e., subchannel) directions.

Likewise, the UL subframe 404 may include UL bursts of various bit lengths composed of the uplink data being communicated. Therefore, the UL-MAP 416, transmitted as the first burst in the downlink subframe 402, may contain information about the location of the UL burst for different users. The UL subframe 404 may include additional control information as illustrated in FIG. 4A. The UL subframe 404 may include a UL ACK 418 allocated for the mobile station (MS) to feed back a DL hybrid automatic repeat request acknowledge (HARQ ACK) and/or a UL CQICH 420 allocated for the MS to feed back channel state information on the Channel Quality Indicator channel (CQICH). Furthermore, the UL subframe 404 may comprise a UL Ranging subchannel 422. The UL Ranging subchannel 422 may be allocated for the MS to perform closed-loop time, frequency, and power adjustment, as well as bandwidth requests. Altogether, the preamble 408, the FCH 410, the DL-MAP 414, and the UL-MAP 416 may carry information that enables the receiver 304 to correctly demodulate the received signal.

For OFDMA, different "modes" can be used for transmission in DL and UL. An area in the time domain where a certain mode is used is generally referred to as a zone. One type of zone is called DL-PUSC (downlink partial usage of subchannels) and may not use all the subchannels available to it (i.e., a DL-PUSC zone may only use particular groups of subchannels). There may be a total of six subchannel groups, which can be assigned to up to three segments. Thus, a segment can contain one to six subchannel groups (e.g., segment 0 contains the first two subchannel groups, segment 1 contains the next two, and segment 2 contains the last two subchannel groups). Another type of zone is called DL-FUSC (downlink full usage of subchannels). Unlike DL-PUSC, DL-FUSC does not use any segments, but can distribute all bursts over the complete frequency range.

Exemplary DL-MAP and DL-MAP IEs

Figure 5A:
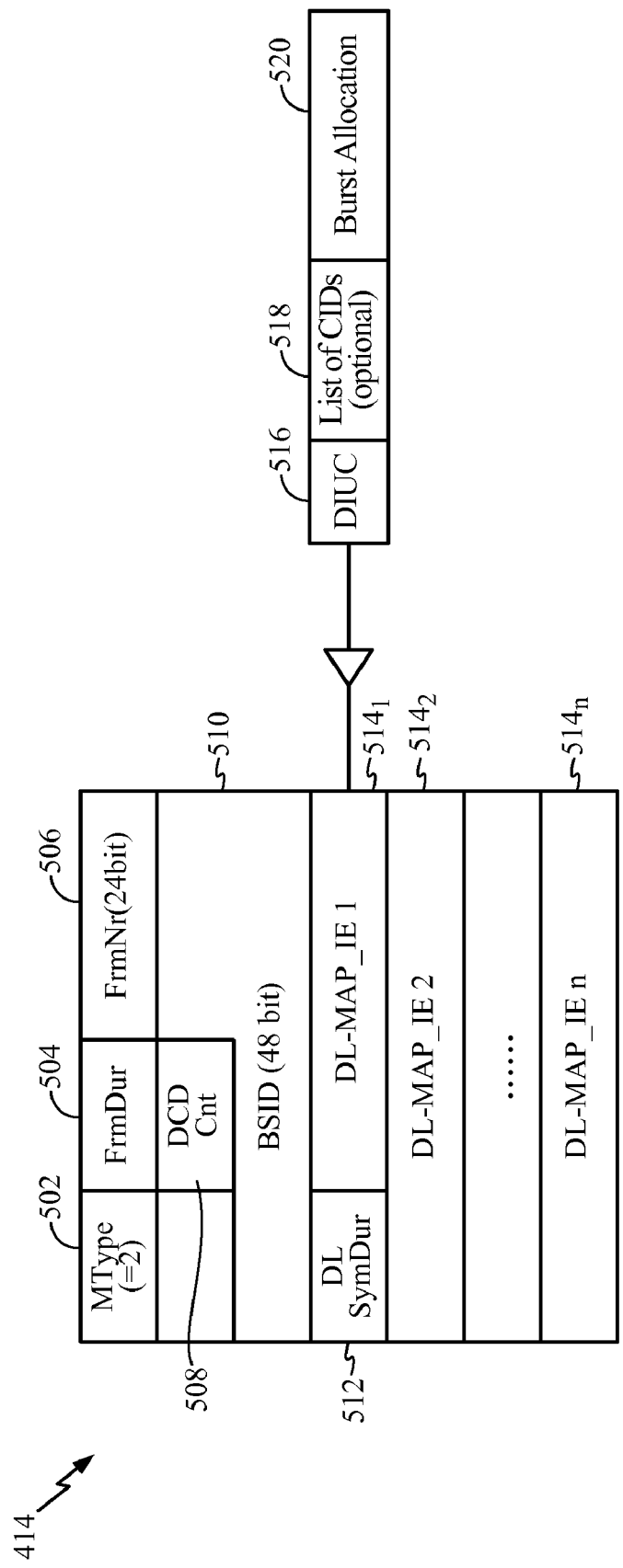

The DL-MAP 414 of FIG. 4A is illustrated in more detail in FIG. 5A with FIG. 5B illustrating the length in bits of each component of the DL-MAP 414. The DL-MAP 414 may begin with a Management Message Type 502 having a length of 8 bits, which has a value of 2 ($00000010_b$) to indicate the control message is a DL-MAP. The Management Message Type 502 may be followed by a frame duration code 504, which is 8 bits long, and a frame number 506, which is 24 bits long. The frame number 506 may be followed by a Downlink Channel Descriptor (DCD) count 508 having a length of 8 bits and matching the DCD configuration change count value. The DCD message refers to physical and Media Access Control (MAC) layer-related parameters to be applied to the downlink channel configuration of the sector. The DCD count 508 may be followed by a base station identifier (BSID) 510, having a length of 6 bytes for a total length of 48 bits. The BSID 510 may uniquely identify the base station in the network and may be followed by a DL symbol duration 512 indicating a number of OFDMA symbols in the DL subframe 402 and having a length of 8 bits. Altogether, the DL-MAP 414 up to this point has a length of 104 bits (8+8+24+48+8 bits).

A number (n) of DL-MAP information elements (IEs) 514 having variable lengths may follow the DL symbol duration 512. A generic DL-MAP IE 514 may comprise a Downlink Interval Usage Code (DIUC) 516, a list of connection IDs 518, and the DL burst allocation 520 (e.g., subchannel offset, symbol offset, subchannel number, and symbol number) to define a downlink transmission. A DIUC 516 between 0 and 12 inclusive may indicate that the DL-MAP IE provides a DL burst profile (i.e., the modulation and coding scheme used in the burst), while a DIUC 516 of 14 or 15 may indicate that the DL-MAP IE is a control information element. A DIUC 516 of 13 may indicate that the DL-MAP IE is used for safety zones (i.e., gap) and peak-to-average-power ratio (PAPR) reduction. Although not shown in FIG. 5A, some embodiments of the DL-MAP 414 may include padding having a length of 4 bits in an effort to reach a byte boundary for the DL-MAP 414.

Figure 6A:
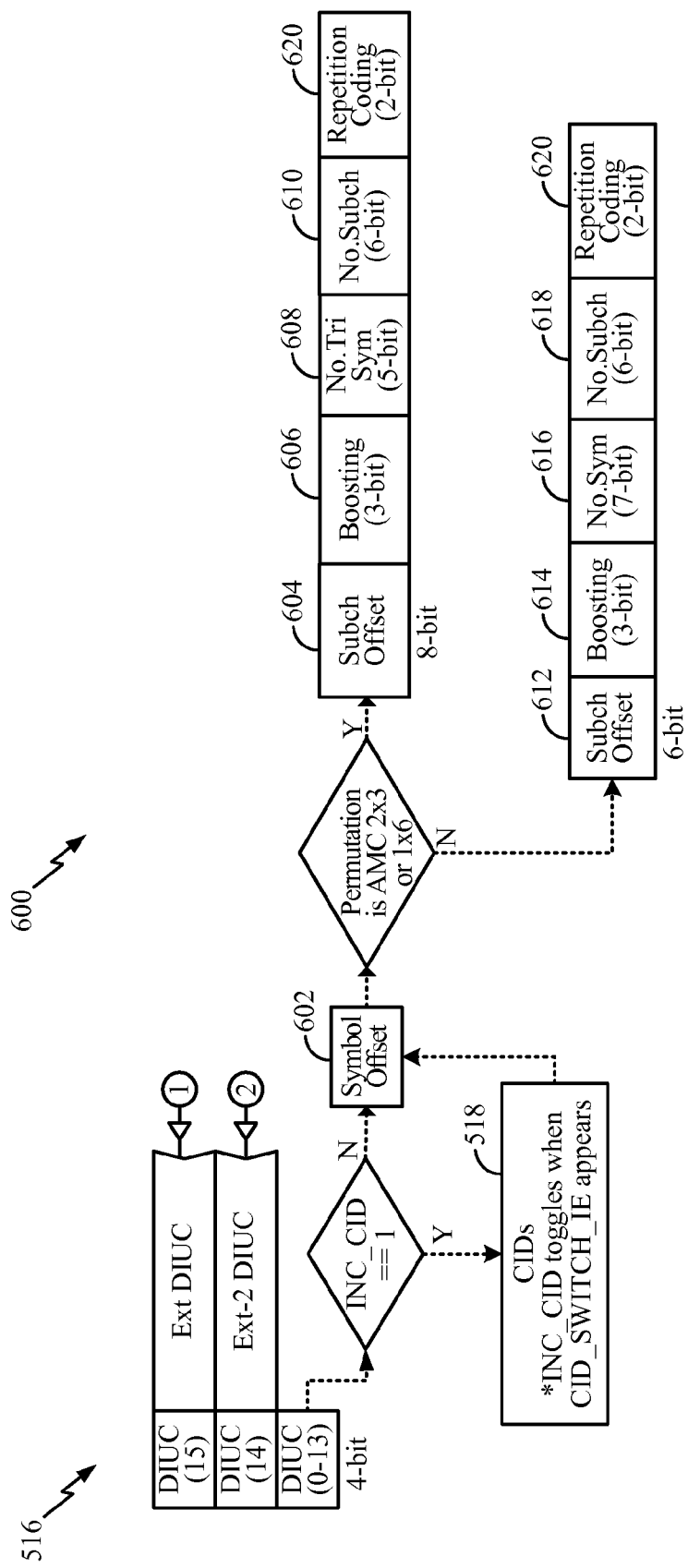
FIGS. 6A-C illustrate different types of DL-MAP IEs, in accordance with certain embodiments of the present disclosure.
Figure 6B:
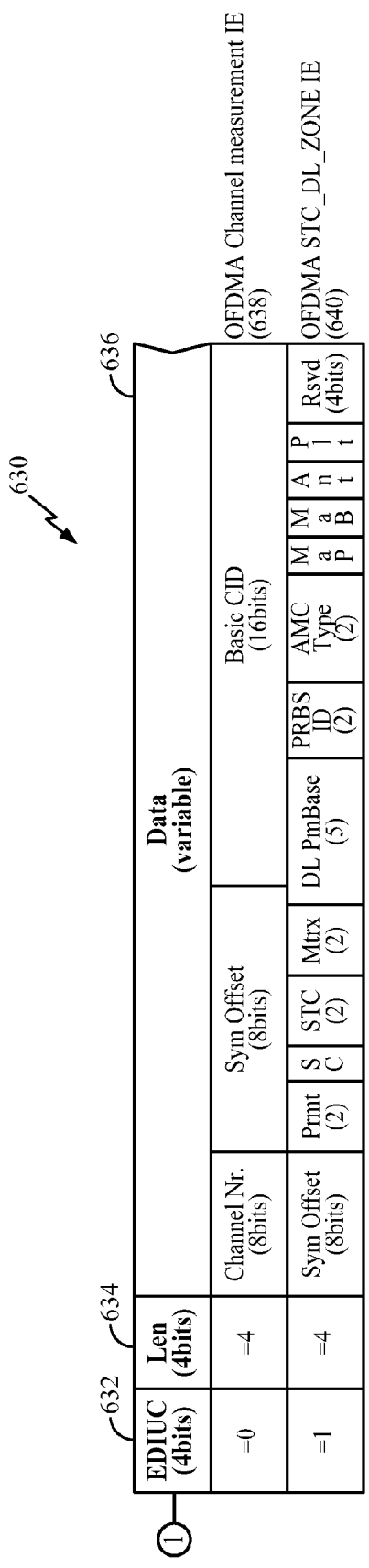
Figure 6C:
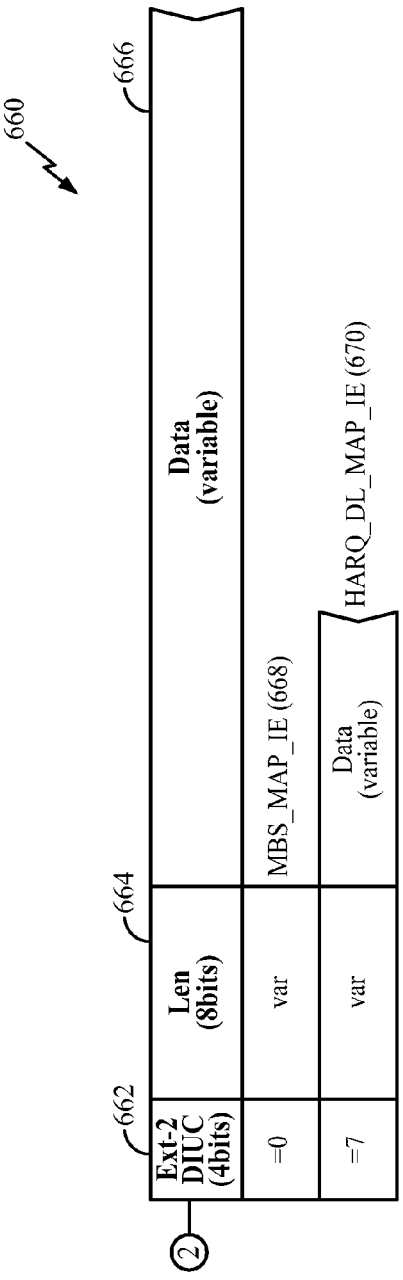

Referring now to FIGS. 6A-6C, examples of different types of DL-MAP IEs 514 are illustrated in greater detail. FIG. 6A illustrates DL-MAP IEs having DIUC 516 values equal to 15, 14, or 0-13. When the DIUC 516 has a value between 0 and 13 inclusive, the DL-MAP IE 600 of FIG. 6A may include a list of connection identifiers (CIDs) 518 depending on whether INC_CID (include CID) was toggled to a value of 1 by CID_SWITCH_IE. If INC_CID is equal to 1, then the DL-MAP IE 600 may have a value indicating the number of CIDs (N_CID) having a length of 8 bits and a corresponding number of CIDs assigned for this IE, each having a length of 16 bits as illustrated in FIG. 7A. If INC_CID is equal to 0, then the DL-MAP IE 600 has a length of zero bits for the list of CIDs 518. Following the optional list of CIDs 518, the DL-MAP IE 600 may be composed of an OFDMA symbol offset 602 having a length of 8 bits.

Adaptive modulation and coding (AMC), also known as link adaptation, denotes matching of the modulation, coding, and other signal and protocol parameters to the conditions of the wireless channel (e.g. channel loss, receiver sensitivity, available transmitter power, and interference from other transmitters). Depending on the AMC scheme used, the DL-MAP IE 600 may have at least two different structures. If the AMC permutation is 2 bins by 3 symbols (2×3) or 1 bin by 6 symbols (1×6), then the DL-MAP IE 600 may be configured with the upper structure in FIG. 6A, with a subchannel offset 604 having a length of 8 bits, a boosting field 606 having a length of 3 bits, a number of OFDMA triple symbols field 608 having a length of 5 bits, and a number of subchannels field 610 having a length of 6 bits. Otherwise, the DL-MAP IE 600 may be configured with the lower structure in FIG. 6A, with a subchannel offset 612 having a length of 6 bits, a boosting field 614 having a length of 3 bits, a number of OFDMA symbols field 616 having a length of 7 bits, and a number of OFDMA subchannels field 618 having a length of 6 bits. The boosting fields 606, 614 may have various three-bit values indicating the boosting value, where $000_b$ indicates no boosting, $001_b$ indicates +6 dB boosting, $010_b$ indicates −6 dB boosting, $011_b$ indicates +9 dB boosting, $100_b$ indicates +3 dB boosting, $101_b$ indicates −3 dB boosting, $110_b$ indicates −9 dB boosting, and $111_b$ indicates −12 dB boosting.

The DL-MAP IE 600 may then include a repetition coding indication 620 having a length of 2 bits. The repetition coding indication 620 may have various two-bit values indicating the repetition coding, where $00_b$ indicates no repetition coding, $01_b$ indicates repetition coding of 2 used, $10_b$ indicates repetition coding of 4 used, and $11_b$ indicates repetition coding of 6 used. Therefore, a DL-MAP IE 600 without a list of CIDs 518 may have a length of 36 bits (4+8+22+2 bits), while a DL-MAP IE 600 with a list of CIDs 518 (INC_CID=1) may have a length of 44 bits +16 bits*N_CID.

FIG. 6B illustrates a DL-MAP Extended IE 630. After the DIUC 516 having a 4-bit value of 15 ($1111_b$), the DL-MAP Extended IE 630 may have an Extended DIUC 632 having a length of 4 bits as illustrated in FIG. 7B, a length field 634 having a length of 4 bits, and a data field 636 having various lengths according to the length field 634. Therefore, the DL-MAP Extended IE 630 may have a length of 12 bits (4+4+4 bits) plus the value in the length field 634, in units of bytes. If the extended DIUC 632 is equal to 0, then the DL-MAP Extended IE 630 may be for an OFDMA channel measurement IE 638 having a value of 4 bytes in the length field 634 and a corresponding length of 32 bits in the data field 636. If the Extended DIUC 632 is equal to 1, then the DL-MAP Extended IE 630 may be for an OFDMA STC_DL_ZONE IE 640 as illustrated, also having a value of 4 bytes in the length field 634 and a corresponding length of 32 bits in the data field 636.

FIG. 6C illustrates a DL-MAP Extended-2 IE 660. After the DIUC 516 having a 4-bit value of 14 ($1110_b$), the DL-MAP Extended-2 IE 660 may have an Extended-2 DIUC 662 having a length of 4 bits as illustrated in FIG. 7C, a length field 664 having a length of 4 bits, and a data field 666 having various lengths according to the length field 664. Therefore, the DL-MAP Extended-2 IE 660 may have a length of 16 bits (4+4+8 bits) plus the value in the length field 664, in units of bytes. If the Extended-2 DIUC 662 is equal to 0, then the DL-MAP Extended-2 IE 660 may be for an MBS_MAP_IE 668. If the Extended-2 DIUC 662 is equal to 7 ($0111_b$), then the DL-MAP Extended-2 IE 660 may be for a HARQ_DL_MAP_IE 670 as illustrated.

Exemplary DL-MAP IE Decoding and Parsing

Although the DL-MAP 414 contains the DL-MAP IEs 514 for decoding the DL data bursts in an OFDM/OFDMA frame 400, the mobile station (MS) may receive or interpret the DL-MAP message incorrectly. This may be determined by an error-detecting technique, such as a cyclic redundancy check (CRC) or a checksum, for the DL-MAP 414.

Conventionally, the MS discards the entire DL-MAP message if the CRC fails, and therefore, the DL data bursts cannot be further decoded. Since the DL-MAP may comprise several symbols, the probability for failure is high. This results in a high packet error rate and slows down the wireless system, especially if the CRC for the DL-MAP message fails on a mobile station waking up from a sleep mode, which may entail waiting several seconds until the next paging before receiving a new DL-MAP. However, a DL-MAP message CRC failure does not necessarily mean that all of the DL-MAP IEs have errors; some of the DL-MAP IEs may be error-free. Furthermore, the DL-MAP 414 is broadcast by a base station to several mobile stations, but only a few DL-MAP IEs may pertain to a particular mobile station. Thus, it may not matter to that particular mobile station if one or more of the DL-MAP IEs that are irrelevant are decoded unsuccessfully.

Therefore, certain embodiments of the present disclosure provide methods and apparatus to parse the DL-MAP IEs in the DL-MAP 414 such that the DL-MAP IEs may continue to be decoded, whether or not a DL-MAP message CRC failure has occurred. The known DL-MAP IE structure patterns and bit length possibilities corresponding to various DIUCs 516 according to the IEEE 802.16x standard may enable such parsing operations. In other words, if the bit values and locations of a DL-MAP IE being decoded (regardless of a DL-MAP message CRC failure) do not match the known possible patterns, that DL-MAP IE may be ignored.

Figure 8:
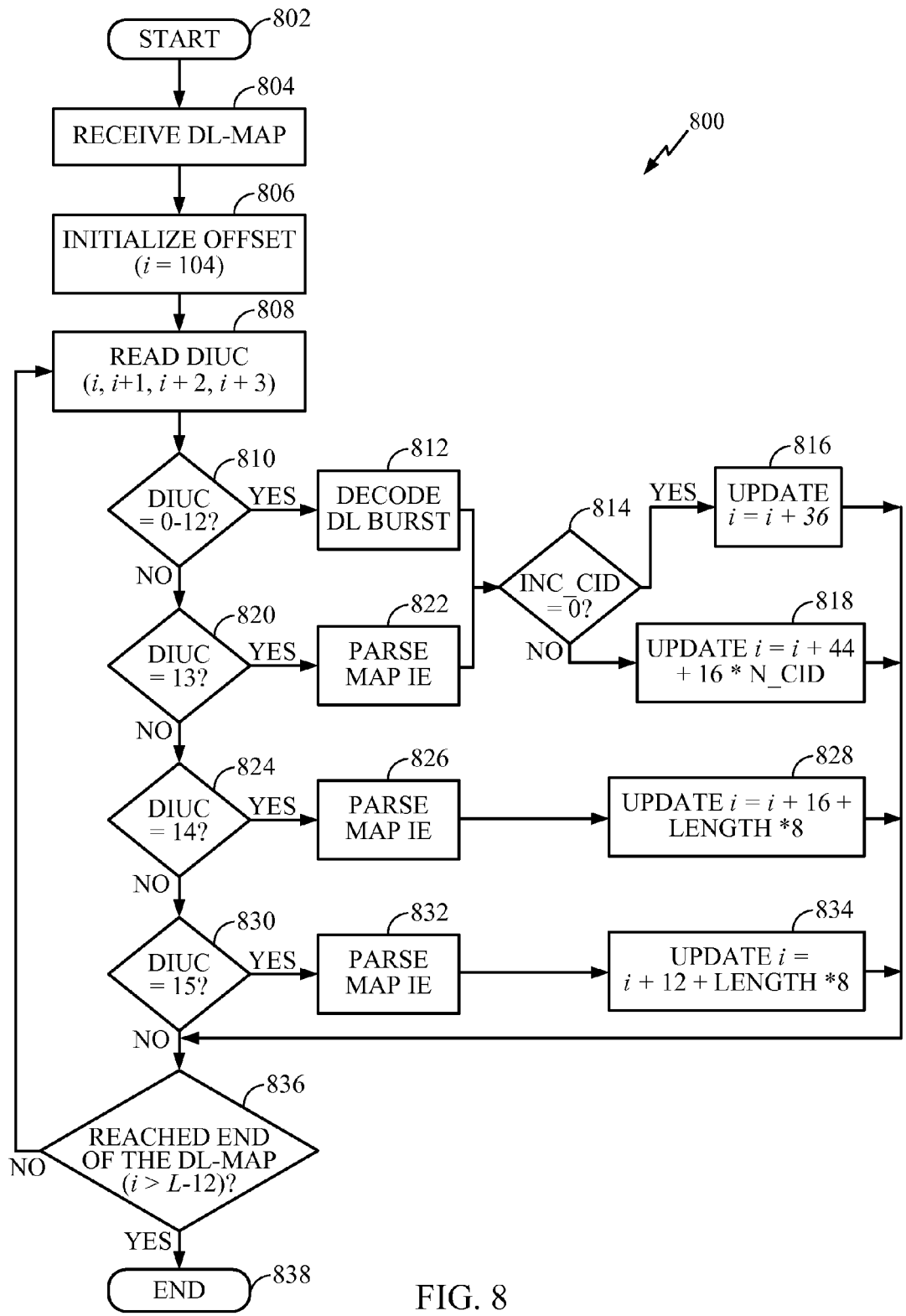
FIG. 8 is a flow chart of example operations for parsing the DL-MAP IEs in the DL-MAP, in accordance with certain embodiments of the present disclosure.

FIG. 8 illustrates a flow diagram of example operations 800 for parsing the DL-MAP IEs in the DL-MAP 414. The operations may begin at 802, and at 804, a DL-MAP 414 of an OFDM/OFDMA frame may be received. For some embodiments, the CRC of the DL-MAP message may be checked. If the CRC passes, parsing of the DL-MAP message according to the remainder of the operations 800 of FIG. 8 may be skipped since all of the DL-MAP IEs may be assumed to contain valid data. Assuming that the DL-MAP 414 has a payload with a length of L bits (indexed from i=0 to L−1, where L may be known from the FCH 410), the offset for the DL-MAP may be initialized at 806 according to the known and fixed length of the components of the DL-MAP 414 prior to the DL-MAP IEs (i.e., i=104). At 808, the four bits (i, i+1, i+2, and i+3) of the DIUC 516 may be read.

If the DIUC is between 0 and 12 inclusive at 810, then the remainder of the DL-MAP IE 600 may be read, and the DL data burst corresponding to the DL-MAP IE 600 may be decoded at 812. The DL data burst is correctly decoded if the data burst passes the CRC, and a correctly decoded DL data burst may be delivered to higher layers of the Open Systems Interconnection Reference Model (OSI model). Otherwise, the DL data burst cannot be decoded successfully (e.g., due to an error in the DL-MAP IE 600 or the data burst itself) and is discarded. Regardless, the bit index (i) of the DL-MAP may be updated so that other DL data bursts may be decoded and potentially kept as correctly decoded in an effort to reduce the packet error rate and increase the wireless system throughput.

At 814, if INC_CID equals 0, then the bit index may be updated with i=i+36 at 816, indicating that the DL-MAP IE 600 did not include a list of CIDs 518s as described above. In contrast, if INC_CID equals 1 (i.e., does not equal 0), then the bit index may be updated with i=i+44+16*N_CID at 818, indicating that the DL-MAP IE 600 does include a list of CIDs 518s as described above.

If the DIUC 516 is not between 0 and 12 inclusive at 810, then the DIUC may be checked at 820 to determine whether the DIUC equals 13. If the DIUC equals 13, then the remainder of the DL-MAP IE 600 may be parsed at 822 (i.e., delineated according to the bit structure indicated by the DIUC 516 and read). Again for the DL-MAP IE 600 with a DIUC=13, if INC_CID equals 0, then the bit index may be updated with i=i+36 at 816, or if not, then the bit index may be updated with i=i+44+16*N_CID at 818.

If the DIUC 516 is not between 0 and 13 inclusive at 810 and 820, then the DIUC may be checked at 824 to determine whether the DIUC equals 14. If the DIUC equals 14, then the remainder of the DL-MAP Extended-2 IE 660 may be parsed at 826. At 828, the bit index may be updated with i=i+16+Length*8, where Length is the byte value in the length field 664.

If the DIUC 516 is not between 0 and 14 inclusive at 810, 820, and 824, then the DIUC may be checked at 830 to determine whether the DIUC equals 15. If the DIUC equals 15, then the remainder of the DL-MAP Extended IE 630 may be parsed at 832. At 834, the bit index may be updated with i=i+12+Length*8, where Length is the byte value in the length field 634.

After the bit index has been updated according to the DIUC 516 at 816, 818, 828, or 834 as described above, the bit index may be checked at 836 to determine if the end of the DL-MAP has been reached (i.e., i>L-12) according to the shortest DL-MAP IE possible according to the IEEE 802.16x standard. If the end has not been reached (i.e., i≦L-12), then the operations 800 may repeat beginning with reading the next DIUC 516 at 808. If the end has been reached, then the operations 800 for parsing the DL-MAP 414 may end at 838.

With the operations 800 of FIG. 8, the DL-MAP IEs may continue to be decoded by the mobile station despite a CRC failure of the DL-MAP message, rather than discarding the entire DL-MAP message as was done conventionally. In this manner, the packet error rate may be reduced, and the wireless system throughput may be increased. The operations 800 may be adjusted as the IEEE 802.16x standard is changed to describe new DL-MAP IE configurations, with new or existing DIUC values, according to the structure and/or the bit length corresponding to the DIUC.

Exemplary UL-MAP and UL-MAP IEs

Figures 9A, 9B:
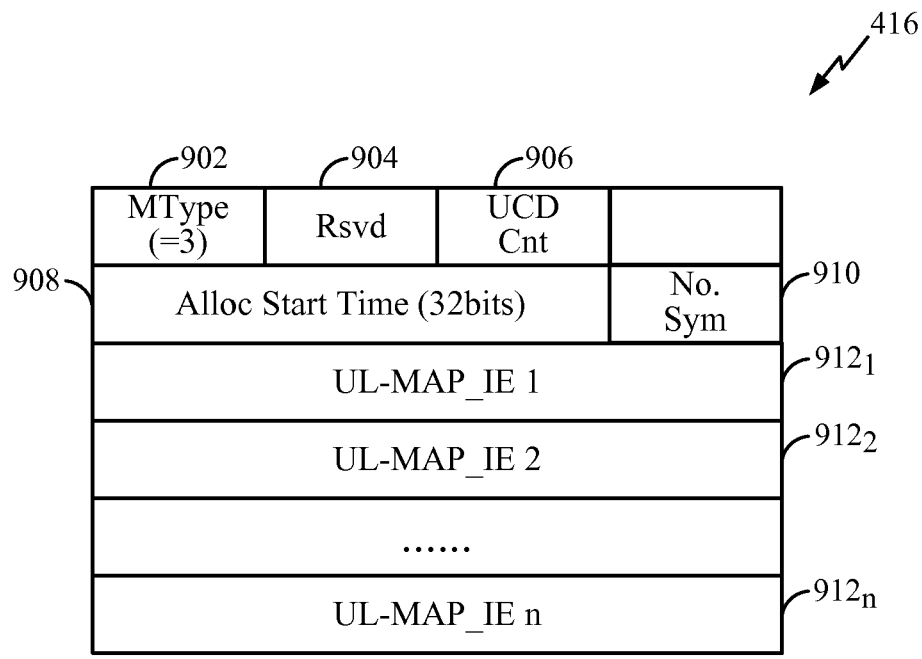
FIGS. 9A and 9B illustrate the format of and the bit size of entries in an uplink map (UL-MAP) message, in accordance with certain embodiments of the present disclosure.

The UL-MAP 416 of FIG. 4A is illustrated in more detail in FIG. 9A with FIG. 9B illustrating the length in bits of each component of the UL-MAP 416. The UL-MAP 416 may begin with a Management Message Type 902 having a length of 8 bits, which has a value of 3 ($00000011_b$) to indicate the control message is a UL-MAP. The Management Message Type 902 may be followed by 8 bits in a reserved field 904. The reserved field 904 may be followed by an Uplink Channel Descriptor (UCD) count 906 having a length of 8 bits and matching the UCD configuration change count value. The UCD message refers to physical and Media Access Control (MAC) layer-related parameters to be applied to the uplink channel configuration of the sector. The UCD count 906 may be followed by an allocation start time 908 having a length of 32 bits and a number of symbols field 910 indicating a number of OFDMA symbols in the UL subframe 404 and having a length of 8 bits. Altogether, the UL-MAP 416 up to this point has a length of 64 bits (8+8+8+32+8 bits).

A number (n) of UL-MAP information elements (IEs) 912 having variable lengths may follow the number of symbols field 910. A generic UL-MAP IE 912 may comprise a connection identifier (CID) and an Uplink Interval Usage Code (UIUC) and may be used to define the uplink transmission. Although not shown in FIG. 9A, some embodiments of the UL-MAP 416 may include padding having a length of 4 bits in an effort to reach a byte boundary for the UL-MAP 416.

Figure 10:
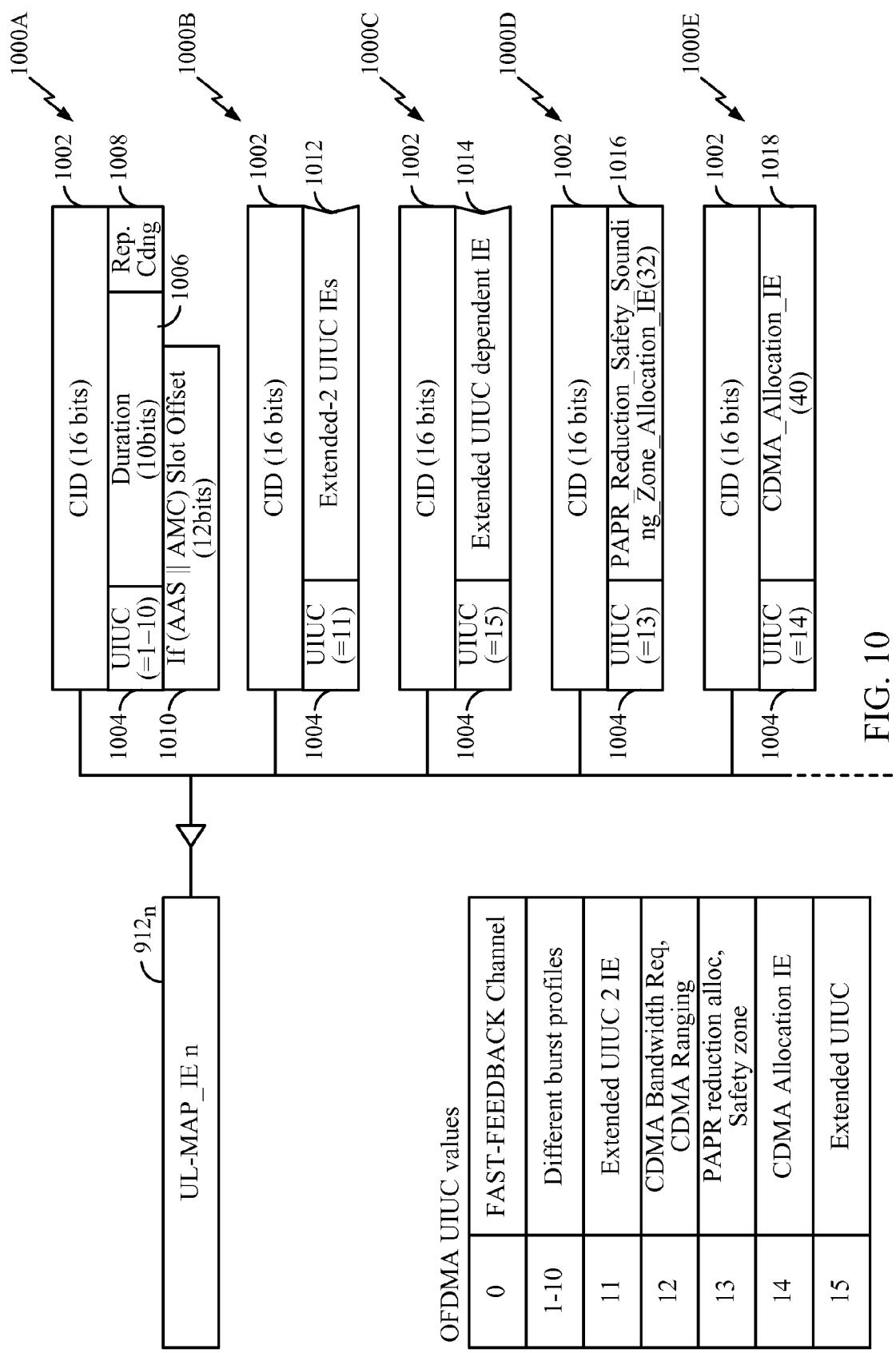
FIG. 10 illustrates different types of UL-MAP IEs and a table of OFDMA Uplink Interval Usage Code (UIUC) values, in accordance with certain embodiments of the present disclosure.

Referring now to FIG. 10, a UL-MAP IE 912 may comprise a CID 1002 having a length of 16 bits, as illustrated in FIGS. 11A-E. The CID 1002 may be followed by a UIUC 1004, which determines the usage for each CID 1002 according to the table of OFDMA UIUC values in FIG. 10, for example. The UL-MAP IE 912 may have various lengths depending on the UIUC 1004, which has a length of 4 bits.

In a UL-MAP IE 1000A having a UIUC 1004 between 1 and 10 inclusive, the UL burst profile (e.g., modulation and coding scheme) may be indicated. As illustrated in FIG. 10, the UIUC 1004 may be followed by a duration 1006 having a length of 10 bits as shown in FIG. 11A. Having units of OFDMA slots, the duration 1006 may be followed by a repetition coding indication 1008 having a length of 2 bits. The repetition coding indication 1008 may have various two-bit values indicating the repetition coding, where $00_b$ indicates no repetition coding, $01_b$ indicates repetition coding of 2 used, $10_b$ indicates repetition coding of 4 used, and $11_b$ indicates repetition coding of 6 used. For some UL-MAP IEs 1000A, if Adaptive Antenna System (AAS) or AMC UL zone is used, then the repetition coding indication 1008 may be followed by a slot offset 1010 having a length of 12 bits. Therefore, a UL-MAP IE 1000A without AAS or AMC UL zone used may have a length of 32 bits (16+4+10+2 bits), while a UL-MAP IE 1000A with AAS or AMC UL zone used may have a length of 44 bits (16+4+10+2+12 bits).

A UL-MAP Extended-2 IE 1000B may have a UIUC 1004 equal to 11 as illustrated in FIG. 10. In a UL-MAP Extended-2 IE 1000B, the UIUC 1004 may be followed by Extended-2 information elements 1012, which may include an Extended-2 UIUC having a length of 4 bits, a length field having a length of 8 bits, and a data field having a varying length according to the length field as illustrated in FIG. 11B. Therefore, a UL-MAP Extended-2 IE 1000B may have a length of 32 bits (16+4+4+8 bits) plus the value in the length field multiplied by 8.

A UL-MAP Extended IE 1000C may have a UIUC 1004 equal to 15 as illustrated in FIG. 10. In a UL-MAP Extended IE 1000C, the UIUC 1004 may be followed by Extended information elements 1014, which may include an Extended UIUC having a length of 4 bits, a length field having a length of 4 bits, and a data field having a varying length according to the length field as illustrated in FIG. 11C. Therefore, a UL-MAP Extended IE 1000C may have a length of 28 bits (16+4+4+4 bits) plus the value in the length field multiplied by 8.

A UIUC 1004 equal to 13 may indicate a UL-MAP IE 1000D for PAPR reduction and safety zones as illustrated in FIG. 10. In such a UL-MAP IE 100D, the UIUC 1004 may be followed by a PAPR_Reduction_Safety_Sounding_Zone_Allocation_IE 1016 having a length of 32 bits as shown in FIG. 11D. Therefore, a UL-MAP IE 1000D with a UIUC=13 may have a length of 52 bits (16+4+32 bits). A UIUC 1004 equal to 0 may indicate a UL-MAP IE for the fast feedback channel, which provides a UL zone for channel quality indication (CQI). Furthermore, a UIUC 1004 equal to 12 may indicate a UL-MAP for code division multiple access (CDMA) ranging and bandwidth requests in a UL zone. Since the data following the UIUC 1004 may also have a length of 32 bits in UL-MAP ILEs with a UIUC=0 or 12, such UL-MAP IEs with a UIUC=0 or 12 may have a similar format to the UL-MAP IE 1000D with a UIUC=13 and thus, may also have a length of 52 bits.

A UIUC 1004 equal to 14 may indicate a UL-MAP IE 1000E for CDMA allocation as illustrated in FIG. 10. In such a UL-MAP IE 100E, the UIUC 1004 may be followed by a CDMA_Allocation_IE 1018 having a length of 40 bits as shown in FIG. 11E. Therefore, a UL-MAP IE 1000E with a UIUC=14 may have a length of 60 bits (16+4+40 bits).

Exemplary UL-MAP IE Decoding and Parsing

Although the UL-MAP 416 contains the UL-MAP IEs 912 for denoting the UL burst allocation in an OFDM/OFDMA frame 400, the mobile station (MS) may receive or interpret the data burst containing the UL-MAP message incorrectly, especially if a DL-MAP IE for a DL data burst containing the UL-MAP 416 is interpreted incorrectly. Such an error in the UL-MAP may be determined by an error-detecting technique, such as a cyclic redundancy check (CRC) or a checksum, for the UL-MAP 416.

Conventionally, the MS discards the entire UL-MAP message if the CRC fails. This results in a high packet error rate and slows down the wireless system, especially if the CRC for the UL-MAP message fails on a mobile station waking up from a sleep mode, which may entail waiting several minutes until the next paging before receiving a new UL-MAP. However, a UL-MAP message CRC failure does not necessarily mean that all of the UL-MAP IEs have errors; some of the UL-MAP IEs may be error-free. Furthermore, the UL-MAP 416 is broadcast by a base station to several mobile stations, but only a few UL-MAP IEs may pertain to a particular mobile station. Thus, it may not matter to that particular mobile station if one or more of the irrelevant UL-MAP IEs are decoded unsuccessfully.

Therefore, certain embodiments of the present disclosure provide methods and apparatus to parse the UL-MAP IEs in the UL-MAP 416 such that the UL-MAP IEs may continue to be decoded, whether or not a UL-MAP message CRC failure has occurred. The known UL-MAP IE structure patterns and bit length possibilities corresponding to various UIUCs 1004 according to the IEEE 802.16x standard may enable such parsing operations. In other words, if the bit values and locations of a UL-MAP IE being decoded (regardless of a UL-MAP message CRC failure) do not match the known possible patterns, that UL-MAP IE may be ignored.

Figure 12:
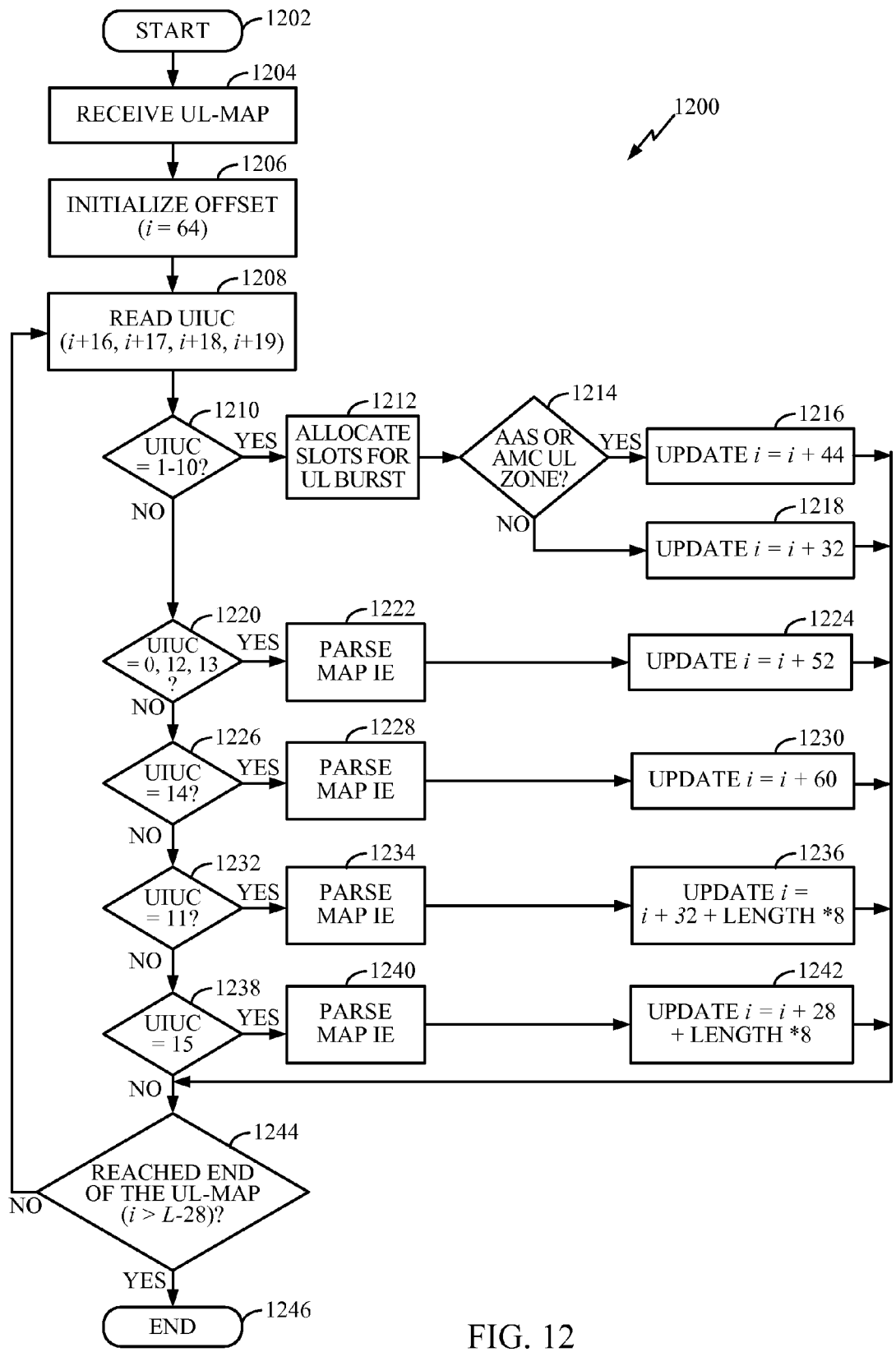
FIG. 12 is a flow chart of example operations for parsing the UL-MAP IEs in the UL-MAP, in accordance with certain embodiments of the present disclosure.

FIG. 12 illustrates a flow diagram of example operations 1200 for parsing the UL-MAP IEs in the UL-MAP 416, similar to the operations 800 of FIG. 8 for parsing the DL-MAP IEs. The operations may begin at 1202, and at 1204, a UL-MAP 416 of an OFDM/OFDMA frame may be received, typically as the first DL data burst. Even if the DL-MAP-message CRC fails, the techniques described above for parsing the DL-MAP 414 may be utilized in an effort to correctly identify the DL data burst that contains the UL-MAP 416. For some embodiments, the CRC of the UL-MAP message may be checked. If the CRC passes, parsing of the UL-MAP message according to the remainder of the operations 1200 of FIG. 12 may be skipped since all of the UL-MAP ILEs may be assumed to contain valid data.

Assuming that the UL-MAP 416 has a payload with a length of L bits (indexed from i=0 to L-1, where L may be known from the DL-MAP IE corresponding to the UL-MAP), the offset for the UL-MAP may be initialized at 1206 according to the known and fixed length of the components of the UL-MAP 416 prior to the UL-MAP ILEs (i.e., i=64). At 1208, the four bits (i+16, i+17, i+18, and i+19) of the UIUC 1004 may be read.

If the UIUC is between 1 and 10 inclusive at 1210, then the remainder of the UL-MAP IE 1000A may be read, and OFDM/OFDMA slots for a UL data burst may be allocated at 1212 according to the UL-MAP IE 1000A. If the CID 1002 of the UL-MAP IE 1000A corresponds to the mobile station that received the UL-MAP at 1204, the UL data burst may be subsequently encoded and transmitted from that mobile station to the base station. The bit index (i) of the UL-MAP may be updated so that other slots may be allocated for UL data bursts in an effort to reduce the packet error rate and increase the wireless system throughput.

At 1214, if AAS or AMC UL zone is indicated, then the bit index may be updated with i=i+44 at 1216, indicating that the UL-MAP IE 1000A includes the slot offset 1010 as described above. In contrast, if neither AAS nor AMC UL zone is indicated, then the bit index may be updated with i=i+32 at 1218, indicating that the UL-MAP IE 1000A does not include the slot offset 1010.

If the UIUC 1004 is not between 1 and 10 inclusive at 1210, then the UIUC may be checked at 1220 to determine whether the UIUC equals 0, 12, or 13. If the UIUC equals 0, 12, or 13, then the remainder of the UL-MAP IE may be parsed at 1222 (i.e., delineated according to the bit structure indicated by the UIUC 1004 and read). At 1224, the bit index may be updated with the length of the corresponding UL-MAP IE (i=i+52) as described above for the UL-MAP IE 100D, for example.

If the UIUC 1004 is not between 0 and 10 inclusive or equal to 12 or 13 at 1210 and 1220, then the UIUC may be checked at 1226 to determine whether the UIUC equals 14. If the UIUC equals 14, then the remainder of the UL-MAP IE 1000E may be parsed at 1228. At 1230, the bit index may be updated with i=i+60.

If the UIUC 1004 is not between 0 and 10 inclusive or between 12 and 14 inclusive at 1210, 1220, and 1226, then the UIUC may be checked at 1232 to determine whether the UIUC equals 11. If the UIUC equals 11, then the remainder of the UL-MAP Extended-2 IE 1000B may be parsed at 1234. At 1236, the bit index may be updated with i=i+32+Length*8, where Length is the byte value in the length field of the Extended-2 ILEs 1012.

If the UIUC 1004 is not between 0 and 14 inclusive at 1210, 1220, 1226, and 1232, then the UIUC may be checked at 1238 to determine whether the UIUC equals 15. If the UIUC equals 15, then the remainder of the UL-MAP Extended IE 1000C may be parsed at 1240. At 1242, the bit index may be updated with i=i+28+Length*8, where Length is the byte value in the length field of the Extended ILEs 1014.

After the bit index has been updated according to the UIUC 1004 at 1216, 1218, 1224, 1230, 1236, or 1242 as described above, the bit index may be checked at 1244 to determine if the end of the UL-MAP has been reached (i.e., i>L-28) according to the shortest UL-MAP IE possible according to the IEEE 802.16x standard. If the end has not been reached (i.e., i≦L-28), then the operations 1200 may repeat beginning with reading the next UIUC 1004 at 1208. If the end has been reached, then the operations 1200 for parsing the UL-MAP 416 may end at 1246.

With the operations 1200 of FIG. 12, the UL-MAP IEs may continue to be decoded by the mobile station despite a CRC failure of the UL-MAP message, rather than discarding the entire UL-MAP message as was done conventionally. In this manner, the packet error rate may be reduced, and the wireless system throughput may be increased. The operations 1200 may be adjusted as the IEEE 802.16x standard is changed to describe new UL-MAP IE configurations, with new or existing UIUC values, according to the structure and the bit length corresponding to the UIUC.

Overview of MAP IE Parsing

Figure 13:
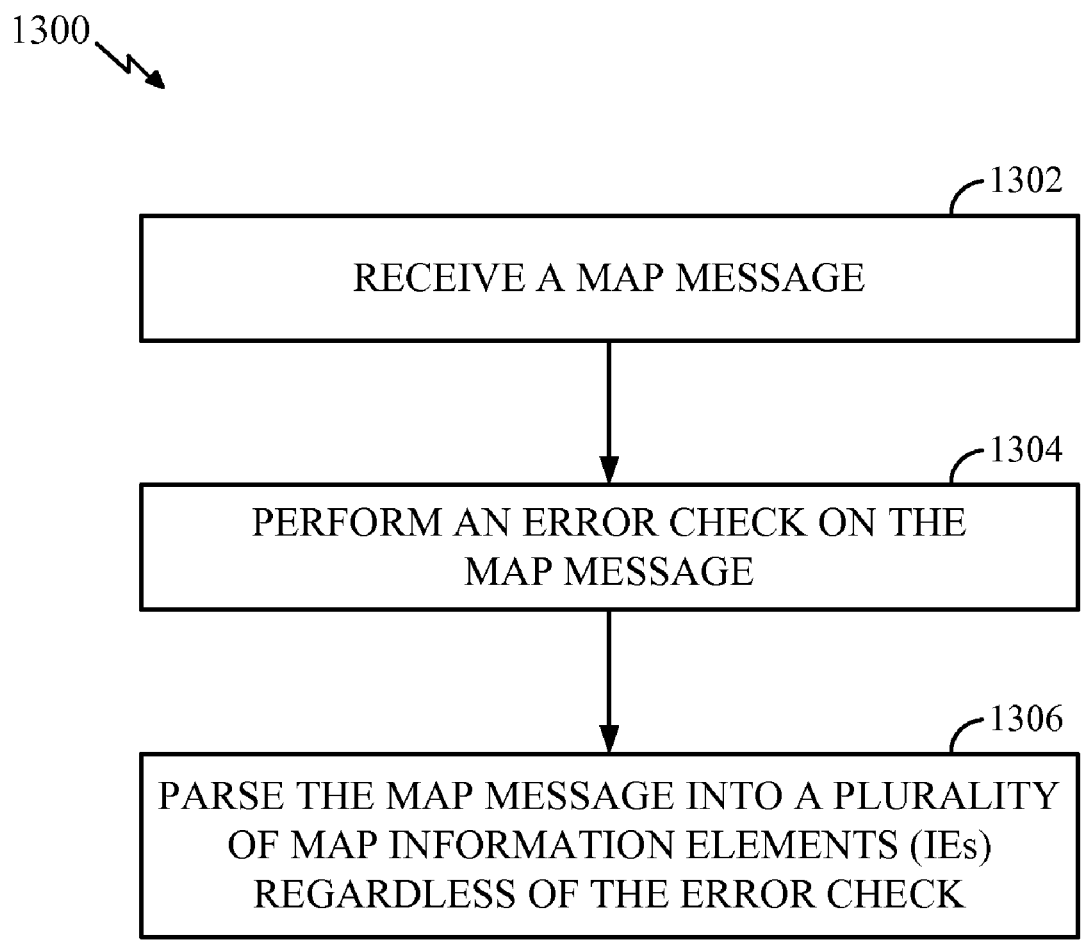
FIG. 13 is a flow chart of example operations for parsing MAP IEs from a MAP in an OFDM/OFDMA frame, in accordance with certain embodiments of the present disclosure.

FIG. 13 illustrates a flow diagram of example operations 1300 for parsing a UL or a DL-MAP message in spite of a failure upon checking the MAP message for errors. The operations may begin, at 1302, by receiving a MAP message. The MAP message may be decoded from a DL-MAP 414 or a UL-MAP 416 of an OFDM/OFDMA frame 400 as described above. At 1304, an error check may be performed on the received MAP message. The series of bits, for example, of the MAP message may be parsed at 1306 into a plurality of MAP IEs, even if the error check for the MAP message failed. The parsing may be performed according to one or more bits indicating the type, structure, and/or length of the MAP IEs, such as the DIUC or UIUC in each of the MAP IEs. For some embodiments, if the error check passes, parsing of the MAP message may be skipped since all of the MAP IEs may most likely contain valid data. In this manner, the MAP IEs may continue to be decoded whether or not the MAP message error check failed, in contrast with the conventional method of discarding the entire MAP message for a detected error.

Figure 13A:
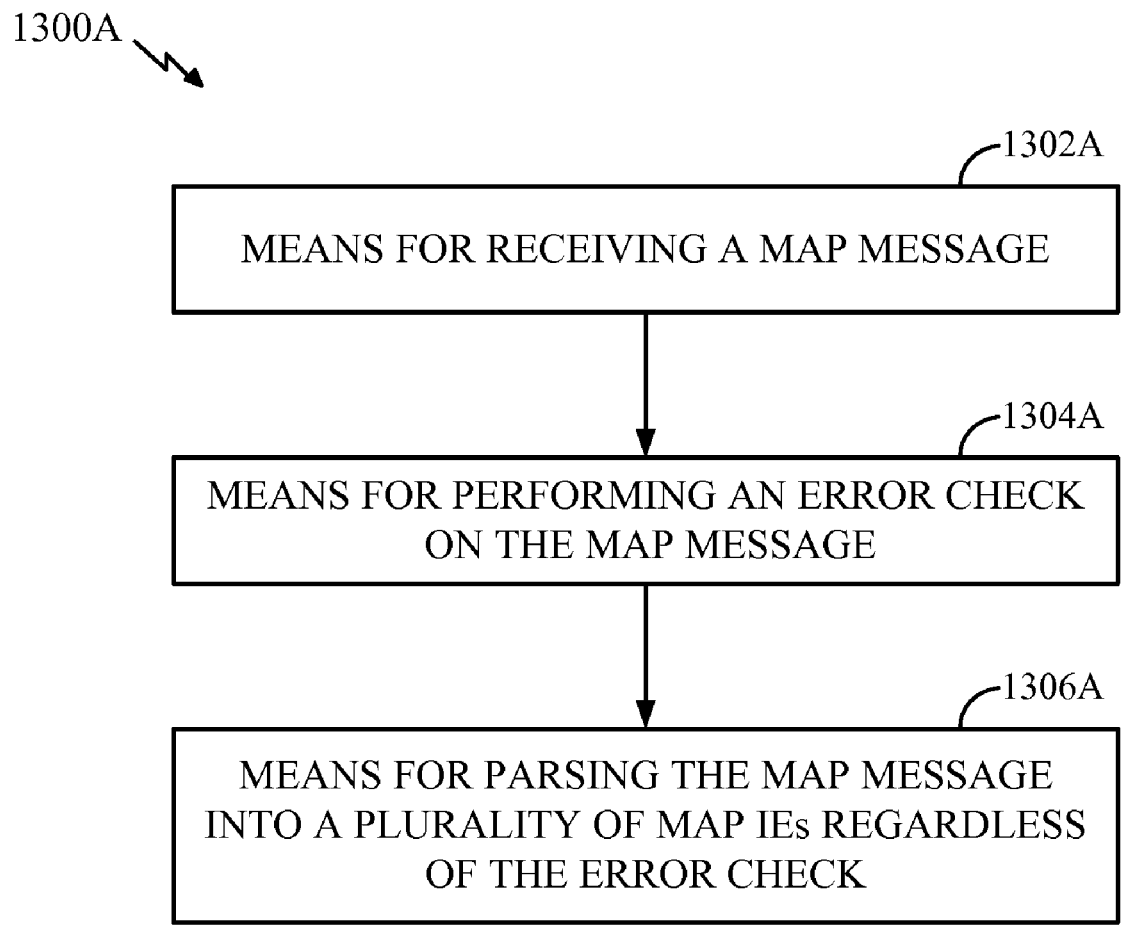
FIG. 13A is a block diagram of means corresponding to the example operations for parsing MAP IEs of FIG. 13, in accordance with certain embodiments of the present disclosure.

The operations 1300 of FIG. 13 described above may be performed by various hardware and/or software component(s) and/or module(s) corresponding to the means-plus-function blocks 1300A illustrated in FIG. 13A. In other words, blocks 1302 through 1306 illustrated in FIG. 13 correspond to means-plus-function blocks 1302A through 1306A illustrated in FIG. 13A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as instructions or one or more sets of instructions on a computer-readable medium or storage medium. A storage media may be any available media that can be accessed by a computer or one or more processing devices. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method comprising:
   receiving a MAP message;
   performing an error check on the MAP message; and
   parsing the MAP message into a plurality of MAP information elements (IEs) based on interval usage codes (IUCs) of the MAP IEs regardless of whether the error check failed.

2. The method of claim 1, wherein the MAP message is an uplink (UL) MAP message, the MAP IEs are UL-MAP IEs, and the IUCs are uplink IUCs (UIUCs).

3. The method of claim 2, wherein parsing the UL-MAP message comprises:
   (a) initializing a bit index in a series of bits for the UL-MAP message;
   (b) reading UIUC bits in the series of bits, starting from the bit index for the UL-MAP message;
   (c) if the UIUC bits indicate data burst allocation, then allocating one or more slots for a UL data burst according to UL-MAP IE bits in the series of bits corresponding to the UIUC bits;
   (d) if the UIUC bits do not indicate data burst allocation, then parsing the UL-MAP IE bits corresponding to the UIUC bits;
   (e) updating the bit index with the length of the UL-MAP IE bits plus the length of the UIUC bits;
   (f) repeating steps (b) through (e) until there are no more UIUC bits in the series of bits for the UL-MAP message.

4. The method of claim 1, wherein the MAP message is a downlink (DL) MAP message, the MAP IEs are DL-MAP IEs, and the IUCs are downlink IUCs (DIUCs).

5. The method of claim 4, wherein parsing the DL-MAP message comprises:
   (a) initializing a bit index in a series of bits for the DL-MAP message;
   (b) reading DIUC bits in the series of bits, starting from the bit index for the DL-MAP message;
   (c) if the DIUC bits indicate data burst allocation, then decoding a DL data burst according to DL-MAP IE bits in the series of bits corresponding to the DIUC bits;
   (d) if the DIUC bits do not indicate data burst allocation, then parsing the DL-MAP IE bits corresponding to the DIUC bits;
   (e) updating the bit index with the length of the DL-MAP IE bits plus the length of the DIUC bits;
   (f) repeating steps (b) through (e) until there are no more DIUC bits in the series of bits for the DL-MAP message.

6. The method of claim 4, further comprising decoding a DL data burst corresponding to one of the DL-MAP IEs to form a data packet.

7. The method of claim 6, further comprising:
   performing a cyclic redundancy check (CRC) on the data packet; and
   discarding the data packet if the CRC on the data packet fails.

8. The method of claim 4, further comprising:
   decoding a DL data burst corresponding to one of the DL-MAP IEs, wherein the DL data burst is an uplink (UL) MAP message;
   performing an error check on the UL-MAP message; and
   parsing the UL-MAP message into a plurality of UL-MAP information elements (ILEs) based on uplink interval usage codes (UIUCs) of the UL-MAP IEs regardless of whether the UL-MAP error check failed.

9. The method of claim 1, wherein the error check comprises a cyclic redundancy check (CRC).

10. The method of claim 1, wherein the MAP message has a format in accordance with one or more standards of the Institute of Electrical and Electronics Engineers (IEEE) 802.16 family of standards.

11. A receiver for wireless communication, comprising:
    error checking logic configured to perform an error check on a MAP message of a signal received by the receiver; and
    parsing logic configured to parse the MAP message into a plurality of MAP information elements (IEs) based on interval usage codes (IUCs) of the MAP IEs regardless of whether the error check failed.

12. The receiver of claim 11, wherein the MAP message is a downlink (DL) MAP message, the MAP IEs are DL-MAP IEs, and the IUCs are downlink IUCs (DIUCs).

13. The receiver of claim 12, wherein the parsing logic is configured to:
    (a) initialize a bit index in a series of bits for the DL-MAP message;
    (b) read DIUC bits in the series of bits, starting from the bit index for the DL-MAP message;
    (c) if the DIUC bits indicate data burst allocation, then decode a DL data burst according to DL-MAP IE bits in the series of bits corresponding to the DIUC bits;
    (d) if the DIUC bits do not indicate data burst allocation, then parse the DL-MAP IE bits corresponding to the DIUC bits;
    (e) update the bit index with the length of the DL-MAP IE bits plus the length of the DIUC bits;
    (f) repeat steps (b) through (e) until there are no more DIUC bits in the series of bits for the DL-MAP message.

14. The receiver of claim 12, further comprising:
    decoding logic configured to decode a DL data burst corresponding to one of the DL-MAP IEs, wherein the DL data burst is an uplink (UL) MAP message;
    UL-MAP error checking logic configured to perform an error check on the UL-MAP message; and
    UL-MAP parsing logic configured to parse the UL-MAP message into a plurality of UL-MAP information elements (ILEs) based on uplink interval usage codes (UIUCs) of the UL-MAP IEs regardless of whether the UL-MAP error check failed.

15. The receiver of claim 11, wherein the MAP message has a format in accordance with one or more standards of the Institute of Electrical and Electronics Engineers (IEEE) 802.16 family of standards.

16. An apparatus for wireless communication, comprising:
    means for receiving a MAP message;
    means for performing an error check on the MAP message; and
    means for parsing the MAP message into a plurality of MAP information elements (IEs) based on interval usage codes (IUCs) of the MAP IEs regardless of whether the error check failed.

17. The apparatus of claim 16, wherein the MAP message is an uplink (UL) MAP message, the MAP IEs are UL-MAP IEs, and the IUCs are uplink IUCs (UIUCs).

18. The apparatus of claim 16, wherein the MAP message is a downlink (DL) MAP message, the MAP IEs are DL-MAP IEs, and the IUCs are downlink IUCs (DIUCs).

19. The apparatus of claim 16, wherein the MAP message has a format in accordance with one or more standards of the Institute of Electrical and Electronics Engineers (IEEE) 802.16 family of standards.

20. A mobile device, comprising:
  a receiver front end for receiving a signal having a MAP message;
  error checking logic configured to perform an error check on the MAP message; and
  parsing logic configured to parse the MAP message into a plurality of MAP information elements (IEs) based on interval usage codes (IUCs) of the MAP IEs regardless of whether the error check failed.

21. The mobile device of claim 20, wherein the MAP message is an uplink (UL) MAP message, the MAP IEs are UL-MAP IEs, and the IUCs are uplink IUCs (UIUCs).

22. The mobile device of claim 21, wherein the parsing logic is configured to:
  (a) initialize a bit index in a series of bits for the UL-MAP message;
  (b) read UIUC bits in the series of bits, starting from the bit index for the UL-MAP message;
  (c) if the UIUC bits indicate data burst allocation, then allocate one or more slots for a UL data burst according to UL-MAP IE bits in the series of bits corresponding to the UIUC bits;
  (d) if the UIUC bits do not indicate data burst allocation, then parse the UL-MAP IE bits corresponding to the UIUC bits;
  (e) update the bit index with the length of the UL-MAP IE bits plus the length of the UIUC bits;
  (f) repeat steps (b) through (e) until there are no more UIUC bits in the series of bits for the UL-MAP message.

23. The mobile device of claim 20, wherein the MAP message has a format in accordance with one or more standards of the Institute of Electrical and Electronics Engineers (IEEE) 802.16 family of standards.

24. A non-transitory computer-readable medium containing a program for interpreting a MAP message, which, when executed by a processor, performs operations comprising:
  performing an error check on the MAP message; and
  parsing the MAP message into a plurality of MAP information elements (IEs) based on interval usage codes (IUCs) of the MAP IEs regardless of whether the error check failed.

25. The non-transitory computer-readable medium of claim 24, wherein the MAP message is a downlink (DL) MAP message, the MAP IEs are DL-MAP IEs, and the IUCs are downlink IUCs (DIUCs).

26. The non-transitory computer-readable medium of claim 25, wherein parsing the DL-MAP message comprises:
  (a) initializing a bit index in a series of bits for the DL-MAP message;
  (b) reading DIUC bits in the series of bits, starting from the bit index for the DL-MAP message;
  (c) if the DIUC bits indicate data burst allocation, then decoding a DL data burst according to DL-MAP IE bits in the series of bits corresponding to the DIUC bits;
  (d) if the DIUC bits do not indicate data burst allocation, then parsing the DL-MAP IE bits corresponding to the DIUC bits;
  (e) updating the bit index with the length of the DL-MAP IE bits plus the length of the DIUC bits;
  (f) repeating steps (b) through (e) until there are no more DIUC bits in the series of bits for the DL-MAP message.

27. The non-transitory computer-readable medium of claim 25, further comprising:
  decoding a DL data burst corresponding to one of the DL-MAP IEs to form a data packet;
  performing a cyclic redundancy check (CRC) on the data packet; and
  discarding the data packet if the CRC on the data packet fails.

28. The non-transitory computer-readable medium of claim 25, further comprising:
  decoding a DL data burst corresponding to one of the DL-MAP IEs, wherein the DL data burst is an uplink (UL) MAP message;
  performing an error check on the UL-MAP message; and
  parsing the UL-MAP message into a plurality of UL-MAP information elements (IEs) based on uplink interval usage codes (UIUCs) of the UL-MAP IEs regardless of whether the UL-MAP error check failed.

29. The non-transitory computer-readable medium of claim 24, wherein the MAP message has a format in accordance with one or more standards of the Institute of Electrical and Electronics Engineers (IEEE) 802.16 family of standards.

* * * * *